US009021877B2

(12) United States Patent
Kelnhofer et al.

(10) Patent No.: US 9,021,877 B2
(45) Date of Patent: May 5, 2015

(54) METHOD AND DEVICE FOR DETERMINING AN AIR MASS FLOW FLOWING THROUGH A RAM AIR CHANNEL

(71) Applicant: Airbus Operations GmbH, Hamburg (DE)

(72) Inventors: Juergen Kelnhofer, Jork (DE); Dariusz Krakowski, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 21 days.

(21) Appl. No.: 13/934,957

(22) Filed: Jul. 3, 2013

(65) Prior Publication Data
US 2013/0291651 A1    Nov. 7, 2013

Related U.S. Application Data

(63) Continuation of application No. PCT/EP2012/000062, filed on Jan. 9, 2012.

(60) Provisional application No. 61/431,109, filed on Jan. 10, 2011.

(30) Foreign Application Priority Data

Jan. 10, 2011 (DE) .......................... 10 2011 008 219

(51) Int. Cl.
*G01F 1/06* (2006.01)
*G01F 1/76* (2006.01)
*B64D 13/06* (2006.01)

(52) U.S. Cl.
CPC ........ *G01F 1/76* (2013.01); *B64D 13/06* (2013.01); *B64D 2013/0618* (2013.01); *Y02T 50/56* (2013.01)

(58) Field of Classification Search
None
See application file for complete search history.

(56) References Cited

U.S. PATENT DOCUMENTS

| 2001/0007337 | A1 | 7/2001 | Buchholz |
| 2002/0152765 | A1 | 10/2002 | Sauterleute |
| 2003/0084681 | A1 | 5/2003 | Haas |
| 2005/0011217 | A1 | 1/2005 | Brutscher |
| 2013/0269374 | A1 | 10/2013 | Kelnhofer |

FOREIGN PATENT DOCUMENTS

| DE | 101 19 433 | 8/2002 |
| DE | 101 39 483 | 3/2003 |
| DE | 103 01 465 | 8/2004 |
| DE | 10 2007 023 685 | 10/2008 |
| DE | 10 2010 054 448 | 6/2012 |
| EP | 1 116 655 | 7/2001 |
| EP | 1 386 837 | 2/2004 |

OTHER PUBLICATIONS

International Search Report dated Jun. 21, 2012.

*Primary Examiner* — Robert R Raevis
(74) *Attorney, Agent, or Firm* — Dickinson Wright PLLC

(57) ABSTRACT

A method and a device determines an air mass flow flowing through a ram air channel having disposed therein a feed device adapted in a first operating state of the ram air channel to feed air through the ram air channel and further adapted in a second operating state of the ram air channel to be set in rotation by an air mass flow flowing through the ram air channel. The method includes the step of detecting an actual operational characteristic of the feed device that is characteristic of the air mass flow flowing through the ram air channel in the second operating state of the ram air channel as well as the step of determining the air mass flow flowing through the ram air channel on the basis of the detected actual operational characteristic of the feed device.

14 Claims, 4 Drawing Sheets

METHOD AND DEVICE FOR DETERMINING AN AIR MASS FLOW FLOWING THROUGH A RAM AIR CHANNEL

CROSS REFERENCE TO RELATED APPLICATIONS

This application is a bypass continuation of PCT/EP2012/000062 filed Jan. 9, 2012 which is entitled to and claims the benefit of German Application No. DE 10 2011 008 219.0 filed Jan. 10, 2011 and U.S. Provisional Application No. 61/431,109, filed Jan. 10, 2011, the disclosures of each of which, including the specification, claims, drawings and abstract, are incorporated herein by reference in their entirety.

FIELD

The present invention relates to a method of determining an air mass flow flowing through a ram air channel, in particular a ram air channel integrated into an aircraft air conditioning system. The invention further relates to a device suitable for implementing such a method.

BACKGROUND

Currently in commercial aircraft so-called air-assisted air conditioning systems are conventionally used to air-condition the aircraft cabin. An aircraft air conditioning system is used to cool the aircraft cabin, which would otherwise become overheated as a result of heat loads, such as for example insolation, the body heat of passengers and waste heat from equipment on board the aircraft. The aircraft air conditioning system moreover feeds sufficient fresh air into the aircraft cabin to ensure that there is a prescribed minimum oxygen content in the aircraft cabin.

Air-assisted aircraft air conditioning systems generally comprise an air conditioning unit, which is supplied with compressed process air from the engines of the aircraft or from a separate compressor. Before being supplied to the air conditioning unit the process air is pre-cooled in a preliminary heat exchanger by transferring heat to cooling air that has likewise been provided by the engines of the aircraft or a separate compressor. The cooling capacity of the preliminary heat exchanger is controlled by a corresponding control of the cooling air mass flow through the preliminary heat exchanger. In the air conditioning unit the process air, as it flows through a heat exchanger unit, is cooled by transferring heat to ambient air flowing through a ram air channel. The ambient air mass flow through the ram air channel and consequently the cooling capacity of the heat exchanger unit of the air conditioning unit are controlled by opening and/or closing corresponding ram air channel flaps.

The structure of an air conditioning unit 100 described for example in DE 10 2010 054 448 may be seen in FIG. 1. The air conditioning unit 100 comprises a process-air feed line 102, through which hot process air generated by a process air source configured in the form of an aircraft engine or a separate compressor is fed at a high pressure to the air conditioning unit 100. In order to control the process air flow through the process-air feed line 102 a control valve 104 is disposed in the process-air feed line 102. The air flowing through the process-air feed line 102 is conveyed through a first heat exchanger 106, during which it is cooled down to ca. 40° C. to 100° C., and then fed to a compressor 108. In the compressor 108 the process air is compressed and at the same time heated. In order to avoid damage to the compressor 108 and/or to components of the air conditioning unit 100 disposed downstream of the compressor 108, the heating of the air as it flows through the compressor 108 has to be limited to temperatures of ca. 220° C. and 260° C. The cooling of the process air, which is to be fed to the compressor 108, by means of the first heat exchanger 106 therefore enables a greater compression of the process air in the compressor 108 and hence the realization of a higher cooling capacity of the air conditioning unit 100.

From the compressor 108 the compressed process air is fed through a line 110 to a second heat exchanger 112, is cooled as it flows through the second heat exchanger 112 and then conveyed through a line 114 to a turbine 124. If desired, the process air prior to feeding into the turbine 124 may be conveyed for further cooling additionally through at least one further heat exchanger disposed upstream of the turbine 124. In the turbine 124 the air is expanded and at the same time cooled down anew. The compressor 108 is disposed with the turbine 124 on a common shaft 125 and is driven by means of the turbine 124.

The first and the second heat exchanger 106, 112 are disposed in a ram air channel 128, through which cold ambient air flows while the aircraft is flying. When the air-craft is operating on the ground, on the other hand, a feed device 130 configured in the form of a blower is used to convey ambient air for cooling the first and second heat exchanger 106, 112 through the ram air channel 128. While the aircraft is flying, the feed device 130 simultaneously continuously rotates when during flying of the aircraft the turbine 124 drives the compressor 108 and hence also sets in rotation the feed device 130 disposed with the compressor/turbine arrangement on a common shaft 125, in which case however the feed device 130 does not feed an ambient air mass flow through the ram air channel 128.

Both during flying and during ground operation of the aircraft the ambient air flow through the ram air channel 128 is controlled by a corresponding positioning of flaps 136, 138 that are disposed in an inlet region and an outlet region of the ram air channel 128. The feed device 130 is disposed with the compressor 108 and the turbine 124 on a common shaft 125, so that the turbine 124 drives not only the compressor 108 but also the feed device 130. A revolutions counter 140 is used to acquire the rotational speed of the shaft 125. An assembly group comprising the turbine 124, the compressor 108 and the feed device 130 is conventionally referred to as an air cycle machine (ACM), wherein the ACM, if need be, may comprise a plurality of turbines, a plurality of compressors and/or a plurality of feed devices.

Further known from the background art is an air conditioning unit 100, which is shown in FIG. 2 and in which the feed device 130 configured in the form of a blower does not interact with the shaft 125 of the compressor/turbine arrangement, i.e. is not disposed jointly with the compressor 108 and the turbine 124 on the shaft 125. In the air conditioning unit 100 represented in FIG. 2 the ACM therefore comprises merely the compressor/turbine arrangement, not however the feed device 130, which is driven via a shaft 142 by a separate motor 144 configured for example in the form of an electric motor. The revolutions counter 140 then determines the rotational speed of the shaft 142 that drives the feed device 130.

During operation of the air conditioning units of prior art operating situations may arise, in which an actual mass flow of the ambient air flowing through the ram air channel and used to cool the heat exchangers disposed in the ram air channel deviates from a set value, i.e. is too high or too low. The reason for such a deviation of the actual mass flow of the ambient air flowing through the ram air channel from a set value may be for example damage of the ram air channel, gaps between individual ram air channel components or leakages in the ram air channel caused by special ram air channel flaps, which are used to prevent excess pressures or excessively high air mass flows in the ram air channel. A deviation of the actual mass flow of the ambient air flowing through the ram air channel from a set value may moreover be caused by mechanical or electrical faults in the operation of the ram air channel flaps or by blockages inside the ram air channel.

A deviation of the actual mass flow of the ambient air flowing through the ram air channel from a set value may be detected in known air conditioning units by pressure measurements by means of corresponding pressure sensors disposed in the ram air channel or indirectly by means of sensors that are not disposed directly in the ram air channel, and may be evaluated by means of a corresponding software logic integrated for example into the control software of the air conditioning system. These methods are however not only comparatively complex but also occasionally inaccurate, with the result that problems associated with a deviation of the actual mass flow of the ambient air flowing the ram air channel from a set value may be identified either not at all or only by corresponding maintenance activity. A routine check of the ambient air mass flow flowing through a ram air channel of an aircraft in the course of regular maintenance intervals is however undesirable on the grounds of cost.

The underlying object of the invention is to provide an easy-to-implement method of determining an air mass flow flowing through a ram air channel, which is in particular integrated into an aircraft air conditioning system. A further underlying object of the invention is to indicate a device suitable for implementing such a method.

SUMMARY

This object is achieved by a method having features of attached claims and by a device having features of attached claims.

The method according to the invention is used to determine an air mass flow flowing through a ram air channel. The ram air channel may be a ram air channel integrated to into an aircraft air conditioning system but also any other ram air channel provided on board an aircraft. Disposed in the ram air channel is a feed device, which may be configured for example in the form of a blower. In a first operating state of the ram air channel the feed device is used to feed air through the ram air channel. In a second operating state of the ram air channel, on the other hand, the feed device is set in rotation by an air mass flow flowing through the ram air channel. When an aircraft equipped with the ram air channel is operating on the ground, the ram air channel is operated preferably in its first operating state, in which the feed device is used to feed air through the ram air channel. When an aircraft equipped with the ram air channel is flying, on the other hand, the ram air channel is operated preferably in its second operating state, in which the feed device disposed in the ram air channel is set in rotation by the ambient air that is pressed into the ram air channel while the aircraft is flying.

In the method according to the invention an actual operational characteristic of the feed device is detected, which in the second operating state of the ram air channel, i.e. when the feed device is set in rotation by an air mass flow flowing through the ram air channel, is characteristic of the air mass flow flowing through the ram air channel. In order to detect the actual operational characteristic of the feed device, it is possible to use for example a suitable sensor or the like. The actual operational characteristic of the feed device may be detected continuously, independently of whether the ram air channel is operated in its first or its second operating state. If the actual operational characteristic of the feed device is detected both in the first and in the second operating state of the ram air channel, then for determining the air mass flow flowing through the ram air channel preferably only the actual operational characteristic detected in the second operating state of the ram air channel is used to determine the air mass flow flowing through the ram air channel.

A correlation between the detected actual operational characteristic of the feed device and the air mass flow flowing through the ram air channel may be stored in the form of corresponding equations or look-up tables in a memory of a computing unit and take into account parameters relating to the feed device and the ram air channel. For example, an equation or look-up table describing the relationship between the detected actual operational characteristic of the feed device and the air mass flow flowing through the ram air channel may contain parameters relating to the dimensions and/or specific operational characteristics of the feed device and/or of the ram air channel. The memory and/or the computing unit may take the form of a separate device or separate devices or be integrated into the controller of a higher-level system, for example into an aircraft air conditioning system controller.

The method according to the invention makes use of the discovery that in the second operating state of a ram air channel an actual operational characteristic of a feed device disposed in a ram air channel allows conclusions to be drawn about the air mass flow flowing through the ram air channel in the second operating state of the ram air channel. In order to implement the method according to the invention there is therefore no need to equip the ram air channel with additional components, such as for example additional sensors or electronic components for processing the sensor signals. Rather, the method according to the invention utilizes existing components of the ram air channel to reliably and accurately determine the air mass flow flowing through the ram air channel in the second operating state of the ram air channel.

The method according to the invention of determining an air mass flow flowing through a ram air channel in the second operating state of the ram air channel is particularly well suited for use in a ram air channel, in which the feed device disposed in the ram air channel, as FIG. 2 shows, is not disposed with a compressor/turbine arrangement on a common shaft but driven by a separate motor.

In principle it is conceivable to correlate various actual operational characteristics of the feed device, for example an air pressure acting upon the feed device in the second operating state of the ram air channel or the like, with the air mass flow flowing through the ram air channel in the second operating state of the ram air channel and hence use this as a measure of the air mass flow flowing through the ram air channel in the second operating state of the ram air channel. However, in a preferred embodiment of the method according to the invention of determining an air mass flow flowing through a ram air channel, as an actual operational characteristic of the feed device a speed of the feed device is detected. In order to detect the speed of the feed device, it is possible to use for example a speed sensor that acquires the rotational speed of a shaft connected to the feed device.

Whereas the speed of the feed device in the first operating state of the ram air channel is determined by the motor that drives the feed device and/or by the compressor/turbine arrangement that drives the feed device, the speed of the feed device in the second operating state of the ram air channel is directly dependent upon the air mass flow flowing through the ram air channel in the second operating state of the ram air channel. Thus, the speed of the feed device in the second operating state of the ram air channel may be directly correlated with the air mass flow flowing through the ram air channel, i.e. may be used as a measure of the air mass flow flowing through the ram air channel in the second operating state of the ram air channel. Consequently, a speed sensor that is used to control the feed device in the first operating state of the ram air channel may be used in the second operating state of the ram air channel to determine the air mass flow flowing through the ram air channel. It is therefore advantageously possible to dispense with equipping the ram air channel with additional components.

In a preferred embodiment of the method according to the invention the detected actual operational characteristic of the feed device is compared with a set operational characteristic of the feed device. On the basis of the comparison of the detected actual operational characteristic of the feed device with the set operational characteristic of the feed device it is then ascertained whether the air mass flow flowing through the ram air channel in the second operating state of the ram air channel corresponds to a desired set air mass flow. For example, the actual speed of the feed device that is detected by means of a suitable speed sensor in the second operating state of the ram air channel may be compared with a set speed of the feed device in to the second operating state of the ram air channel. The set values of the operational characteristic of the feed device may be stored in the form of corresponding equations or look-up tables in a memory of a computing unit, wherein the memory and/or the computing unit may take the form of a separate device or separate devices or may be integrated into the controller of a higher-level system, for example into an aircraft air conditioning system controller.

If the detected actual speed of the feed device exceeds the set speed of the feed device, this means that the air mass flow flowing through the ram air channel in the second operating state of the ram air channel is higher than a desired set air mass flow. Conversely, an actual speed of the feed device that is detected in the second operating state of the ram air channel and lies below a set speed may be judged to be an indication that the air mass flow flowing through the ram air channel in the second operating state of the ram air channel is lower than a desired set air mass flow. By means of such an actual/set value comparison it is therefore easily and reliably possible to draw conclusions about the operating state of the ram air channel.

For example, an actual air mass flow flowing through the ram air channel in the second operating state of the ram air channel and lying below a desired set air mass flow may be judged to be an indication that a leakage or a blockage in the ram air channel is interfering with the operation of the ram air channel. An actual air mass flow lying above a desired set air mass flow, on the other hand, indicates faulty operation of a ram air channel inlet flap, a ram air channel outlet flap and/or a pressure relief flap integrated into a ram air channel wall. The actual/set value comparison consequently makes it easy to detect faults that would otherwise be detectable only by means of complex measurements and/or costly maintenance activity.

The set operational characteristic of the feed device is ascertained preferably in dependence upon at least one operating parameter of an aircraft equipped with the ram air channel. In other words, when ascertaining the set operational characteristic of the feed device account is taken of the fact that the set operational characteristic of the feed device depends upon the operating state of an aircraft equipped with the ram air channel. The set values of the operational characteristic of the feed device may be re-calculated by a computing unit in dependence upon the operating parameters of the aircraft equipped with the ram air channel that are communicated to the computing unit by corresponding sensors or control systems or may be taken from a stored look-up table.

For example, as operating parameters of the aircraft equipped with the ram air channel the altitude and/or the flying speed of the aircraft may be used. The previously described actual/set value comparison of the operational characteristic of the feed device may then be used during flying of an aircraft equipped with the ram air channel independently of the altitude and/or the flying speed of the aircraft to ascertain whether the air mass flow flowing through the ram air channel in the second operating state of the ram air channel, i.e. while the aircraft is flying, corresponds to a desired set air mass flow.

The result of the comparison of the detected actual operational characteristic of the feed device with the set operational characteristic of the feed device may be used to detect faulty operation of the ram air channel. In particular it is possible to use the result of the comparison of the detected actual operational characteristic of the feed device with the set operational characteristic of the feed device to detect faulty operation of at least one flap that controls the flow of ambient air through the ram air channel. The flap controlling the flow of ambient air through the ram air channel may be a ram air channel inlet flap, a ram air channel outlet flap and/or a pressure relief flap integrated into a ram air channel wall.

The result of the comparison of the detected actual operational characteristic of the feed device with the set operational characteristic of the feed device and the knowledge gained therefrom regarding the air mass flow flowing through the ram air channel in the second operating state of the ram air channel may be used to control the operation of the ram air channel. In particular the result of the comparison of the detected actual operational characteristic of the feed device with the set operational characteristic of the feed device may be used to control the operation of at least one flap that controls the flow of ambient air through the ram air channel. In other words, if desired, the air mass flow flowing through the ram air channel in the second operating state of the ram air channel may be controlled in dependence upon the actual/set value comparison of the operational characteristic of the feed device.

For example, the air mass flow flowing through the ram air channel in the second operating state of the ram air channel may be reduced by means of corresponding control of the ram air channel flaps, i.e. the ram air channel inlet flap, the ram air channel outlet flap and/or a pressure relief flap integrated into a ram air channel wall, if the actual/set value comparison of the operational characteristic of the feed device indicates that the air mass flow flowing through the ram air channel in the second operating state of the ram air channel is higher than desired. In a similar fashion, the air mass flow flowing through the ram air channel in the second operating state of the ram air channel may be increased by means of corresponding control of the ram air channel flaps if the actual/set value comparison of the operational characteristic of the feed device indicates that the air mass flow flowing through the ram air channel in the second operating state of the ram air channel is lower than desired.

The output of a warning signal and/or an automatic interruption of the operation of the ram air channel is moreover conceivable if a deviation between the actual value and the set value of the operational characteristic of the feed device and hence a deviation between the actual value and the set value of the air mass flow flowing through the ram air channel in the second operating state of the ram air channel exceeds a predetermined threshold value. The processing of the results of the actual/set value comparison of the operational characteristic of the feed device may be effected in a separate computing unit that is in communication with corresponding higher-level control systems. Alternatively, however, the actual/set value comparison of the operational characteristic of the feed device and the processing of the results thereof may be effected in a higher-level control system, for example in an aircraft air conditioning system controller.

A device according to the invention is used to determine an air mass flow flowing through a ram air channel. Disposed in the ram air channel is a feed device that is adapted in a first operating state of the ram air channel to feed air through the ram air channel and is further adapted in a second operating state of the ram air channel to be set in rotation by an air mass flowing through the ram air channel. The device comprises a detection device for detecting an actual operational characteristic of the feed device that is characteristic of the air mass flow flowing through the ram air channel in the second operating state of the ram air channel. A determination device is further provided for determining the air mass flow flowing through the ram air channel on the basis of the detected actual operational characteristic of the feed device.

The detection device, which may be configured for example in the form of a suitable sensor, is preferably adapted to detect as an actual operational characteristic of the feed device a speed of the feed device. The detection device may be disposed for example on a shaft connected to the feed device.

The device according to the invention preferably further comprises an ascertainment device that is adapted to compare the detected actual operational characteristic of the feed device with a set operational characteristic of the feed device and on the basis of the comparison of the detected actual operational characteristic of the feed device with the set operational characteristic of the feed device to ascertain whether the air mass flow flowing through the ram air channel in the second operating state of the ram air channel corresponds to a desired set air mass flow.

The ascertainment device is preferably adapted to ascertain the set operational characteristic of the feed device in dependence upon at least one operating parameter of an aircraft equipped with the ram air channel.

The ascertainment device is preferably adapted to use as an operating parameter of the aircraft equipped with the ram air channel the altitude and/or the flying speed of the aircraft.

The ascertainment device may be adapted to use the result of the comparison of the detected actual operational characteristic of the feed device with the set operational characteristic of the feed device to detect faulty operation of the ram air channel, in particular faulty operation of at least one flap that controls the flow of ambient air through the ram air channel.

The ascertainment device may further be adapted to use the result of the comparison of the detected actual operational characteristic of the feed device with the set operational characteristic of the feed device to control the operation of the ram air channel, in particular the operation of at least one flap that controls the flow of ambient air through the ram air channel.

BRIEF DESCRIPTION OF DRAWINGS

There now follows a detailed description of a preferred embodiment of the invention with reference to the accompanying diagrammatic drawings, which show FIG. 1 a diagrammatic representation of a first example of the state of the art of an air conditioning unit, FIG. 2 a diagrammatic representation of a second example of the state of the art of an air conditioning unit with a ram air channel.

DETAILED DESCRIPTION

Figure 1:
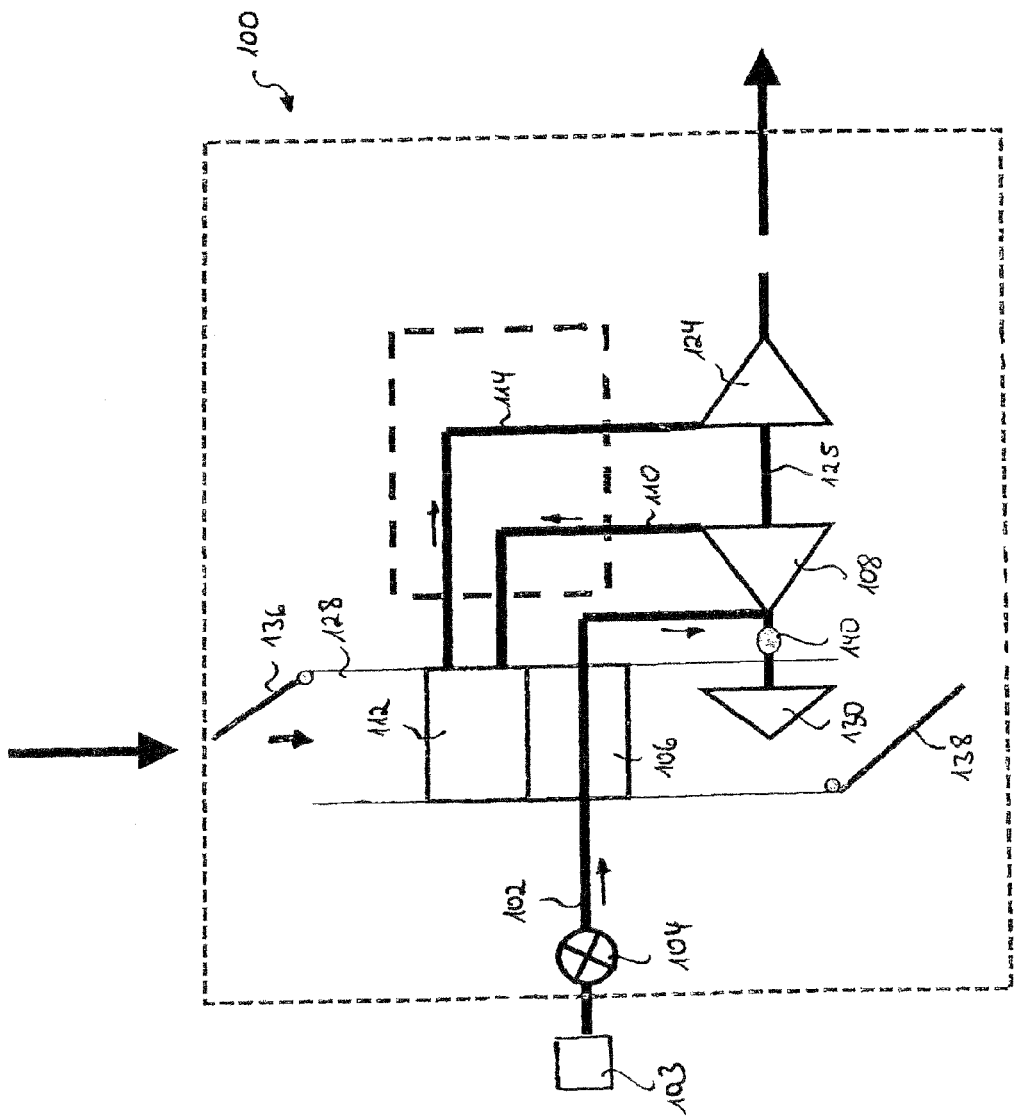
Figure 2:
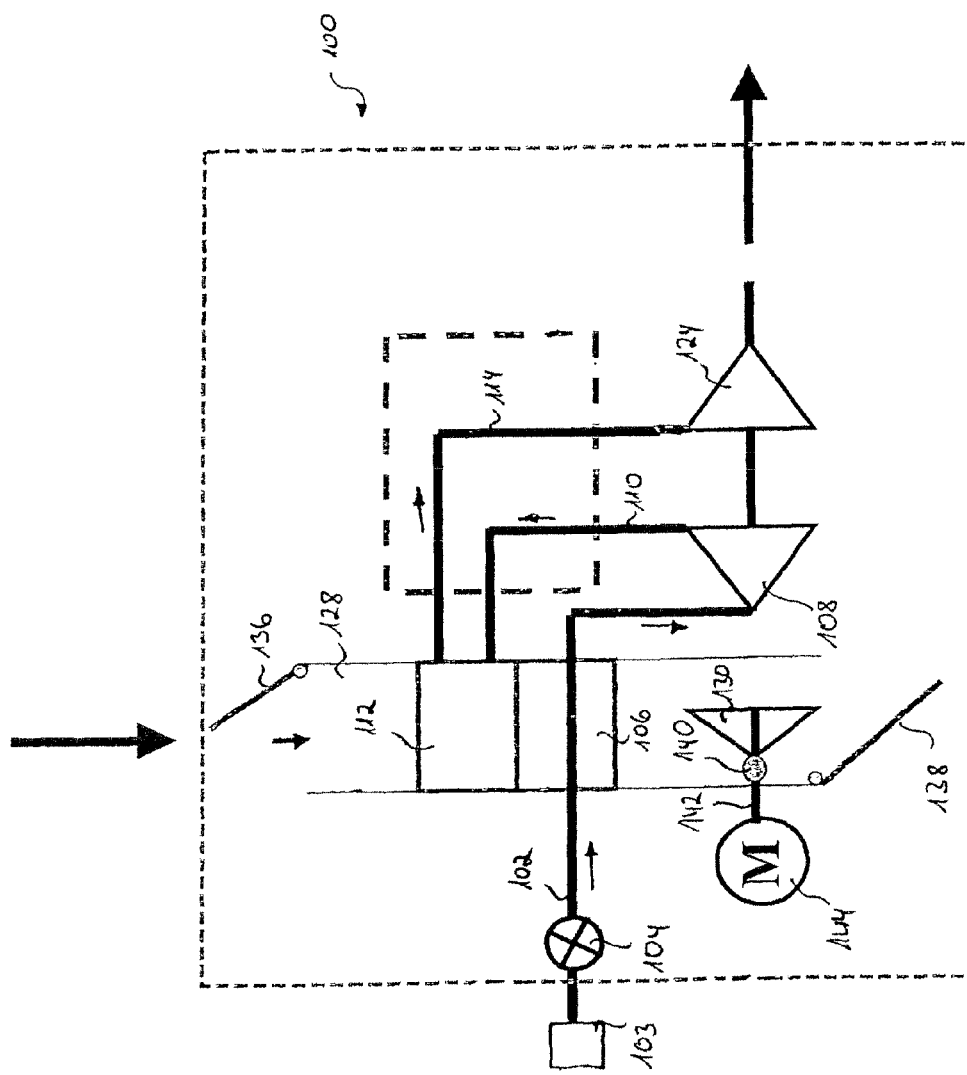

As mentioned above, a feed device 130, which is disposed in a ram air channel 128 of an air conditioning unit 100 integrated into an aircraft air conditioning system, is used during ground operation of an aircraft equipped with the ram air channel 128 to feed ambient air into and through the ram air channel 128. While the aircraft is flying, on the other hand, ambient air is pressed into the ram air channel 128. If, as is shown in FIG. 2, the feed device is mechanically uncoupled from the compressor/turbine arrangement, i.e. is not disposed with the compressor/turbine arrangement on a common shaft, the feed device 130 is set in rotation by the ambient air that flows through the ram air channel 128 while the aircraft is flying, without itself feeding air through the ram air channel 128. In this case, therefore, the higher the air mass flow flowing through the ram air channel 128, the higher the speed of the feed device 130. Consequently, the speed of the feed device 130 while the aircraft is flying may be used as a measure of the air mass flow flowing through the ram air channel 128 while the aircraft is flying.

Figure 3:
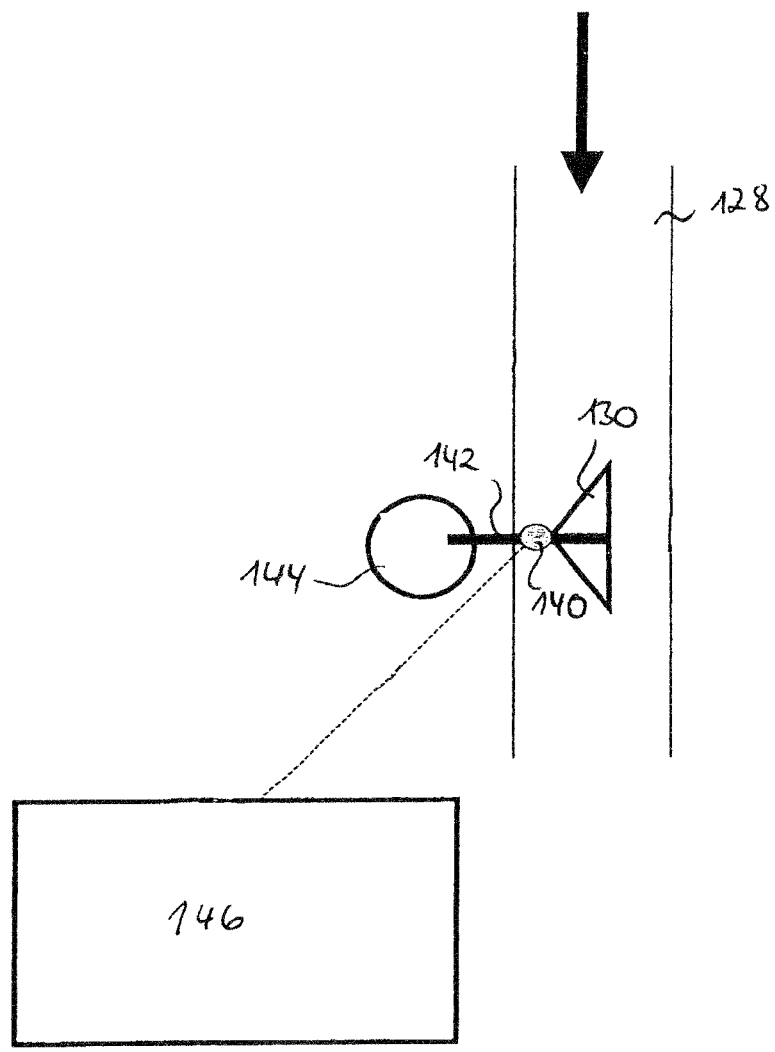
FIG. 3 shows details of modifications, according to the present invention, relative to the air conditioning unit according to FIG. 2.
Figure 4:
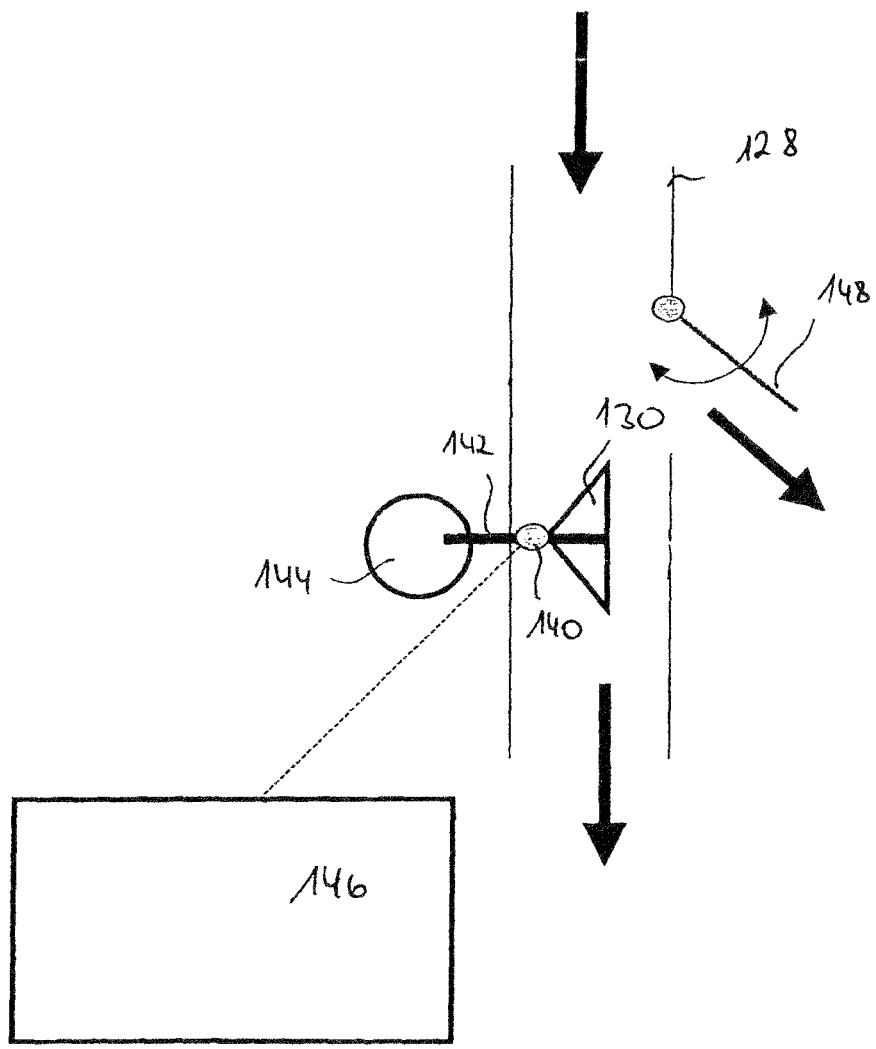
FIG. 4 shows details of modifications, according to the present invention, relative to the air conditioning unit according to FIG. 2.

In the arrangements represented in detail in FIGS. 3 and 4, the feed device 130 is connected by a shaft 142 to a motor 144 that drives the feed device 130. A speed sensor 140 disposed on the shaft 142 determines the rotational speed of the shaft 142 and hence of the feed device 130. While the aircraft is operating on the ground, the rotational speed of the shaft 142 that is determined by the speed sensor 140 may be used to control the motor 144 that drives the shaft 142 and hence the feed device 130. While the aircraft is flying, on the other hand, the speed of the feed device 130 and hence of the shaft 142 is a measure of the air mass flow flowing through the ram air channel 128 while the aircraft is flying.

Thus, in the embodiments shown in FIGS. 3 and 4 the speed sensor 140 is a detection device for detecting an actual operational characteristic (speed) of the feed device 130. A correlation between the speed of the feed device 130 and the air mass flow flowing through the ram air channel 128 while the aircraft is flying is stored in a memory of a computing unit 146, to which the signals emitted by the speed sensor 140 are supplied. On the basis of the signals transferred to it by the speed sensor 140 the computing unit 146 may therefore assign an air mass flow value to each measured speed value. The computing unit 146 therefore forms a determination device for determining on the basis of a detected actual operational characteristic (speed) of the feed device 130 the air mass flow flowing through the ram air channel 128 while the aircraft is flying.

In the memory of the computing unit 146 there are preferably further stored set values of the speed of the feed device 130 in dependence upon at least one operating parameter of an aircraft equipped with the ram air channel 128. As parameters of an aircraft equipped with the ram air channel 128 that are relevant when determining the set values of the speed of the feed device 130 in particular the altitude and/or the flying speed of the aircraft are used. Signals that are characteristic of the altitude and/or the flying speed of the aircraft are therefore transferred to the computing unit 146 and are then taken into account by the computing unit 146 when determining the set values of the speed of the feed device 130.

For each actual speed value detected by the speed sensor 140 the computing unit 146 carries out an actual/set value comparison, i.e. the computing unit 146 compares each measured actual speed value with a set speed value that is determined for the current altitude and/or the current flying speed of the aircraft. On the basis of the comparison of the detected actual speed of the feed device 130 with the set speed of the feed device 130 the computing unit 146 then ascertains whether the air mass flow flowing through the ram air channel 128 while the aircraft is flying corresponds to a desired set air mass flow. The computing unit 146 therefore also forms an ascertainment device that is adapted to compare a detected actual operational characteristic (speed) of the feed device 130 with a set operational characteristic (speed) of the feed device 130 and on the basis of the comparison of the detected actual operational characteristic of the feed device 130 with the set operational characteristic of the feed device 130 to ascertain whether the air mass flow flowing through the ram air channel 128 while the aircraft is flying corresponds to a desired set air mass flow.

If the detected actual speed of the feed device 130 exceeds the set speed of the feed device 130, this means that the air mass flow flowing through the ram air channel 128 while the aircraft is flying is higher than a desired set air mass flow. Conversely, an actual speed of the feed device 130 that is detected while the aircraft is flying and lies below a set speed of the feed device 130 may be judged to be an indication that the air mass flow flowing through the ram air channel 128 while the aircraft is flying is lower than a desired set air mass flow.

The result of the actual/set value comparison of the speed of the feed device 130 and the knowledge gained therefrom regarding the air mass flow flowing through the ram air channel 128 while the aircraft is flying are used to control the operation of the ram air channel 128. For this purpose, the computing unit 146 transfers corresponding signals to a control unit, which is not represented in the figures, in order to control the operation of the ram air channel 128. The control unit for controlling the operation of the ram air channel 128 may take the form of a separate control unit or be integrated into a higher-level control system, for example into an aircraft air conditioning system controller.

The air mass flow flowing through the ram air channel 128 while the aircraft is flying may be reduced for example by means of corresponding control of the ram air channel flaps 136, 138, 148, i.e. the ram air channel inlet flap 136, the ram air channel outlet flap 138 and/or a pressure relief flap 148 integrated into a ram air channel wall, if the actual/set value comparison of the speed of the feed device 130 indicates that the air mass flow flowing through the ram air channel 128 while the aircraft is flying is higher than desired. In a similar fashion, the air mass flow flowing through the ram air channel 128 while the aircraft is flying may be increased by means of corresponding control of the ram air channel flaps 136, 138, 148 if the actual/set value comparison of the speed of the feed device 130 indicates that the air mass flow flowing through the ram air channel 128 while the aircraft is flying is lower than desired.

The invention claimed is:

1. A method of determining an air mass flow flowing through a ram air channel, wherein disposed in the ram air channel is a feed device that is adapted in a first operating state of the ram air channel to feed air through the ram air channel and is further adapted in a second operating state of the ram air channel to be set in rotation by an air mass flow flowing through the ram air channel, and wherein the method comprises the steps:
    detecting an actual operational characteristic of the feed device that is characteristic of the air mass flow flowing through the ram air channel in the second operating state of the ram air channel, and
    determining the air mass flow flowing through the ram air channel on the basis of the detected actual operational characteristic of the feed device.

2. The method according to claim 1, wherein as the actual operational characteristic of the feed device a speed of the feed device is acquired.

3. The method according to claim 1, wherein the detected actual operational characteristic of the feed device is compared with a set operational characteristic of the feed device and that on the basis of the comparison of the detected actual operational characteristic of the feed device with the set operational characteristic of the feed device it is ascertained whether the air mass flow flowing through the ram air channel in the second operating state of the ram air channel corresponds to a desired set air mass flow.

4. The method according to claim 3, wherein the set operational characteristic of the feed device is ascertained in dependence upon at least one operating parameter of an aircraft equipped with the ram air channel.

5. The method according to claim 4, wherein as an operating parameter of the aircraft equipped with the ram air channel the altitude and/or the flying speed of the aircraft is used.

6. The method according to claim 3, wherein the result of the comparison of the detected actual operational characteristic of the feed device with the set operational characteristic of the feed device is used to detect faulty operation of the ram air channel.

7. The method according to claim 3, wherein the result of the comparison of the detected actual operational characteristic of the feed device with the set operational characteristic of the feed device is used to control the operation of the ram air channel.

8. A device for deteimining an air mass flow flowing through a ram air channel, wherein disposed in the ram air channel is a feed device that is adapted in a first operating state of the ram air channel to feed air through the ram air channel and is further adapted in a second operating state of the ram air channel to be set in rotation by an air mass flow flowing through the ram air channel, and wherein the device comprises:
    a detection device for detecting an actual operational characteristic of the feed device that is characteristic of the air mass flow flowing through the ram air channel in the second operating state of the ram air channel, and
    a determination device for determining the air mass flow flowing through the ram air channel on the basis of the detected actual operational characteristic of the feed device.

9. The device according to claim 8, wherein the detection device is adapted to detect as an actual operational characteristic of the feed device a speed of the feed device.

10. The device according to claim 8, further comprising an ascertainment device that is adapted to compare the detected actual operational characteristic of the feed device with a set operational characteristic of the feed device and on the basis of the comparison of the detected actual operational characteristic of the feed device with the set operational characteristic of the feed device to ascertain whether the air mass flow flowing through the ram air channel in the second operating state of the ram air channel corresponds to a desired set air mass flow.

11. The device according to claim 10, wherein the ascertainment device is adapted to ascertain the set operational characteristic of the feed device in dependence upon at least one operating parameter of an aircraft equipped with the ram air channel.

12. The device according to claim 11, wherein the ascertainment device is adapted to use as an operating parameter of the aircraft equipped with the ram air channel the altitude and/or the flying speed of the aircraft.

13. The device according to claim 10, wherein the ascertainment device is adapted to use the result of the comparison of the detected actual operational characteristic of the feed device with the set operational characteristic of the feed device to detect faulty operation of the ram air channel.

14. The device according to claim 10, wherein the ascertainment device is adapted to use the result of the comparison of the detected actual operational characteristic of the feed device with the set operational characteristic of the feed device to control the operation of the ram air channel.

* * * * *